United States Patent
Haider et al.

(10) Patent No.: US 11,474,608 B2
(45) Date of Patent: Oct. 18, 2022

(54) WEARABLE DEVICE TO TEACH, CORRECT, AND MONITOR A MOVEMENT PATTERN OF AN EXERCISE IN THREE DIMENSIONS

(71) Applicant: Amna Haider, Melville, NY (US)

(72) Inventors: Amna Haider, Melville, NY (US); Joseph Muller, III, Madison, WI (US)

(73) Assignee: Amna Haider, Melville, NY (US)

( * ) Notice: Subject to any disclaimer, the term of this patent is extended or adjusted under 35 U.S.C. 154(b) by 125 days.

(21) Appl. No.: 16/883,493

(22) Filed: May 26, 2020

(65) Prior Publication Data

US 2020/0379567 A1 Dec. 3, 2020

Related U.S. Application Data

(60) Provisional application No. 62/853,959, filed on May 29, 2019.

(51) Int. Cl.
| | |
|---|---|
| *G06F 3/01* | (2006.01) |
| *G08B 7/06* | (2006.01) |
| *G09B 19/00* | (2006.01) |
| *A63B 24/00* | (2006.01) |
| *A63B 71/06* | (2006.01) |

(52) U.S. Cl.
CPC .......... *G06F 3/016* (2013.01); *A63B 24/0003* (2013.01); *A63B 71/0622* (2013.01); *G06F 3/012* (2013.01); *G08B 7/066* (2013.01); *G09B 19/003* (2013.01); *A63B 2071/0655* (2013.01); *A63B 2071/0694* (2013.01); *A63B 2225/74* (2020.08)

(58) Field of Classification Search
None
See application file for complete search history.

(56) References Cited

U.S. PATENT DOCUMENTS

| | | |
|---|---|---|
| 5,108,103 A | 4/1992 | Rilling |
| 6,487,906 B1 | 12/2002 | Hock |
| 6,778,866 B1 | 8/2004 | Bettwy |
| 8,652,072 B2 | 2/2014 | Stimson et al. |
| 9,033,712 B2 | 5/2015 | Vasin |

(Continued)

FOREIGN PATENT DOCUMENTS

| | | |
|---|---|---|
| CN | 206809710 U | 12/2017 |
| KR | 20180000581 A | 1/2018 |

*Primary Examiner* — Thomas S McCormack
(74) *Attorney, Agent, or Firm* — Hoffmann & Baron, LLP

(57) ABSTRACT

Provided is a wearable device to provide guidance to a user related to a movement trajectory path of an exercise. The wearable device includes a band, a plurality of vibration motors, at least one processing unit, and a processor. The band is configured to be disposed on a body part to be moved in the exercise. The vibration motors are connected about the band and configured to vibrate when activated. The processing unit is connected to the band and is configured to determine motion data of the motion processing unit as the body part is moved in the exercise. The processor is configured to determine three-dimensional orientation of the band in relation to the trajectory path based on the motion data of the at least one motion processing unit, and configured to activate one or more of the vibration motors to provide guidance to the user based on the trajectory path.

34 Claims, 7 Drawing Sheets

(56) References Cited

U.S. PATENT DOCUMENTS

| | | |
|---|---|---|
| 9,226,697 B1 | 1/2016 | Patil et al. |
| 9,848,803 B2 | 12/2017 | Schaffer |
| 2016/0220176 A1 | 8/2016 | Desnerck et al. |
| 2018/0114460 A1 | 4/2018 | Rivera, Jr. |
| 2018/0133551 A1* | 5/2018 | Chang ................ A63B 24/0075 |
| 2018/0283825 A1 | 10/2018 | Daly |
| 2018/0296878 A1 | 10/2018 | Copelan et al. |
| 2019/0283247 A1* | 9/2019 | Chang ..................... A61H 3/00 |

* cited by examiner

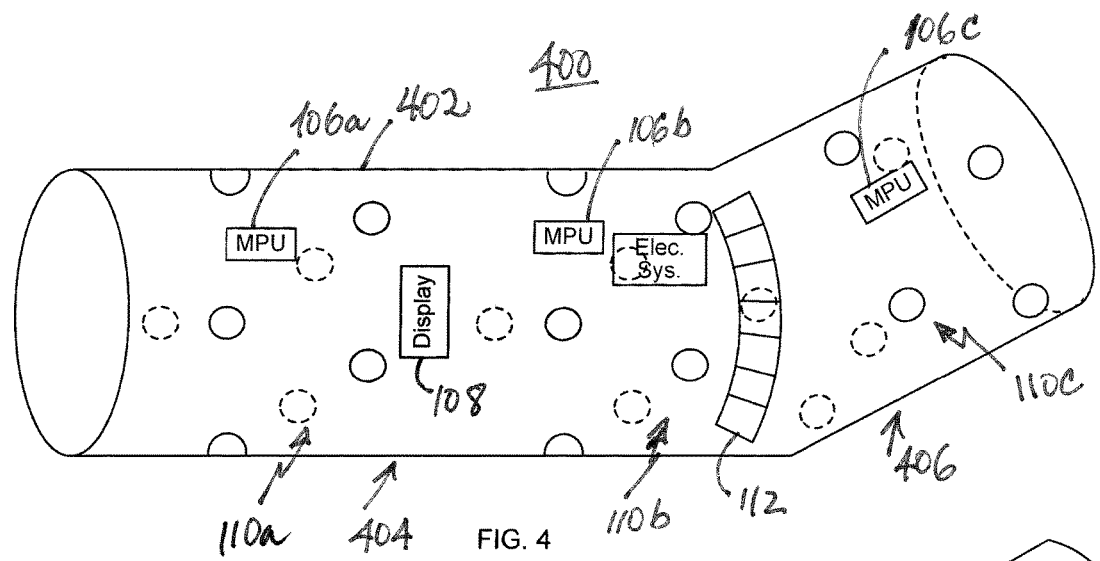
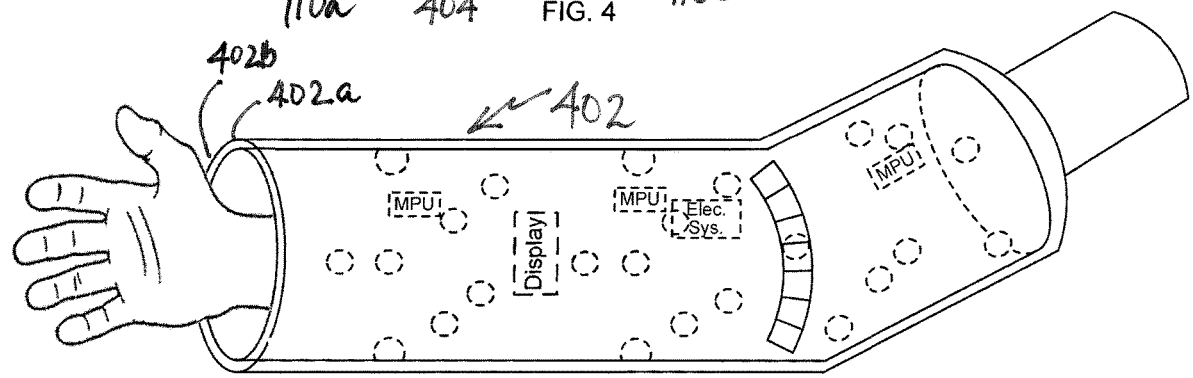
FIG. 5

WEARABLE DEVICE TO TEACH, CORRECT, AND MONITOR A MOVEMENT PATTERN OF AN EXERCISE IN THREE DIMENSIONS

CROSS REFERENCE TO RELATED APPLICATIONS

This application claims benefit of U.S. Provisional Patent Application No. 62/853,959, filed on May 29, 2019, the contents of which are incorporated herein by reference in their entirety.

BACKGROUND

Field

The present application relates to devices for learning and developing movements of exercises. More specifically, the present application is directed to a wearable device and method to teach, correct, and monitor a movement pattern of an exercise in three dimensions.

Brief Discussion of Related Art

Learning and consistently repeating movement of a certain exercise correctly—e.g., arm extension/flexion, shoulder abduction/adduction, wrist pronation/supination—generally or conventionally requires an instructor/trainer who is skilled and/or certified in guiding (e.g., teaching, correcting, and monitoring) a trainee in the correct execution of the movement for that exercise.

Such guidance can include illustration of the movement by the instructor, as well as verbal and/or physical interaction of the trainer with trainee helping to guide the trainee in the correct execution of the movement. Verbal interaction with the trainee can include verbal guidance by the trainer that indicates speed, direction, positioning, etc. during the movement of the exercise.

Physical interaction with the trainee can include active instruction in which the trainer—e.g., using the trainer's hands—actively guides the trainee in the correct performance of the movement for the exercise, such as by correcting speed, direction, positioning, etc. throughout the movement. Passive correction can include the trainer—also using the trainer's hands—passively correcting the trainee (only when required) in the correct performance of the movement for the exercise, such as by correcting speed, direction, positioning, etc. when the trainee deviates from the correct performance of the movement.

While there have been attempts in providing electronic devices that can teach, correct, and/or monitor a movement pattern of an exercise by providing visual and/or physical feedback to the trainee, these devices are generally deficient in that the feedback provided cannot actively guide the trainee (e.g., in a three-dimensional manner) in the performance of the movement for a certain exercise, and/or cannot passively correct the trainee (e.g., in a three-dimensional manner) in the performance of the movement for a certain exercise.

It is therefore desirable to provide a wearable device and method capable of actively or passively teaching, correcting, and monitoring a movement pattern of an exercise in three dimensions to facilitate intuitive learning and consistent repeating of a movement pattern of an exercise.

SUMMARY

The wearable device and method disclosed herein can provide active instruction for a selected movement or exercise. More specifically, the user could use the wearable device in an active instruction mode to learn a movement pattern (e.g., optimal pattern) for a movement or exercise. In this regard, active instruction can be provided with continuous or intermittent vibration of the vibration motors and/or illumination of the light emitting diodes, with a goal of actively instructing the user with vibration along the correct trajectory path associated with the movement or exercise.

Moreover, the wearable device and method can provide passive correction for a selected movement or exercise. More specifically, the user could use the wearable device in a passive correction mode when the user has learned the movement pattern for a movement or exercise, and the user thus requires occasional correction upon deviation from the movement pattern (e.g., optimal pattern) for the movement or exercise. In this regard, passive correction can be provided with occasional vibration with a goal of passively correcting the user with vibration along the correct trajectory path associated with the movement or exercise.

In accordance with an embodiment, a wearable device to provide guidance to a user related to a movement trajectory path of an exercise is disclosed. The wearable device includes a band, a plurality of vibration motors, at least one motion processing unit, and a processor.

The band is configured to be disposed on a body part to be moved in the exercise.

The plurality of vibration motors is connected about the band, the vibration motors configured to vibrate when activated.

The at least one motion processing unit is connected to the band, the motion processing unit configured to determine motion data of the motion processing unit as the body part is moved in the exercise.

The processor is configured to determine three-dimensional orientation of the band in relation to the trajectory path based on the motion data of the at least one motion processing unit, and to activate one or more of the vibration motors to provide guidance to the user based on the trajectory path.

In some cases, the band can be an elastic band configured to be disposed on a wrist or forearm of the user. In other cases, the band can be an elastic band configured to be disposed on a combination of a forearm and an upper arm of the user.

In some cases, the plurality of vibration motors, including a first subset and a second subset, is connected to the band as follows. The first subset can be distributed in increments in a first row disposed circumferentially about the band, and the second subset can be distributed in the increments in a second row disposed circumferentially about the band, wherein the second subset is offset from the first subset along a length of the band, and vibration motors of the first subset are offset or staggered by half an increment in relation to the vibration motors of the second subset.

In some cases, the band includes a forearm section and an upper arm section. The forearm section can include first motion processing units at extents of the forearm section and at least one first set of vibration motors, and the upper arm section can include a second motion processing unit and a second set of vibration motors.

In some cases, the at least one first set of vibration motors includes a first subset of vibration motors and a second subset of vibration motors. The first subset can be distributed in increments in a first row disposed circumferentially about the forearm section of the band, and the second subset can be distributed in the increments in a second row disposed circumferentially about the forearm section of the band, wherein the second subset is offset from the first subset along a length of the forearm section of the band, and vibration motors of the first subset are offset or staggered by half an increment in relation to the vibration motors of the second subset.

In some cases, the second set of vibration motors includes a first subset of vibration motors and a second first subset of vibration motors. The first subset of vibration motors can be distributed in increments in a first row disposed circumferentially about the upper arm section of the band, while the second subset of the vibration motors can be distributed in the increments in a second row disposed circumferentially about the upper section of the band, wherein the second subset is offset from the first subset along a length of the upper arm section of the band, and vibration motors of the first subset are offset or staggered by half an increment in relation to the vibration motors of the second subset.

In some cases, the wearable device further includes a plurality of light emitting diodes connected to the band, and the processor can activate the light emitting diodes that illuminate to guide the user along the trajectory path. In other cases, the wearable device includes a plurality of light emitting diodes connected to the band, and the processor can activate the light emitting diodes that illuminate to guide the user when the user deviates from the trajectory path.

In some cases, the guidance can be active instruction in which the processor can activate the one or more of the vibration motors to guide the user along the trajectory path. In other cases, guidance can be passive correction in which the processor activates the one or more of the vibration motors to guide the user when the user deviates from the trajectory path.

In accordance with an embodiment, a method of providing guidance to a user related to a movement trajectory path of an exercise is disclosed. The method performs the following operations:

disposing a wearable device on a body part of the user to be moved in the exercise, the wearable device includes a band configured to be disposed on the body part, a plurality of vibration motors connected about the band, at least one motion processing unit, and a processor connected to the band;

determining via the motion processing unit motion data as the body part is moved in the exercise;

determining via the processor three-dimensional orientation of the band in relation to the trajectory path based on the motion data of the at least one motion processing unit; and activating via the processor one or more of the vibration motors to provide guidance to the user based on the trajectory path.

In some cases, the band is disposed on a wrist or forearm of the user. In other cases, the band is disposed on a combination of a forearm and an upper arm of the user.

In some cases, the plurality of vibration motors are connected to the band as follows: distributing a first subset of the vibration motors in increments in a first row disposed circumferentially about the band; and distributing a second subset of the vibration motors in the increments in a second row disposed circumferentially about the band, wherein the second subset is offset from the first subset along a length of the band, and vibration motors of the first subset are offset or staggered by half an increment in relation to the vibration motors of the second subset.

In some cases where the band comprises a forearm arm section and an upper arm section, the method includes: disposing first motion processing units at extents of the forearm section, and at least one first set of vibration motors; and disposing a second motion processing unit and a second set of vibration motors at the upper arm section.

In some cases where the at least one first set of vibration motors includes a first subset of vibration motors and a second subset of vibration motors, the method further includes: distributing the first subset of vibration motors in increments in a first row disposed circumferentially about the forearm section of the band; and distributing a second subset of the vibration motors in the increments in a second row disposed circumferentially about the forearm section of the band, wherein the second subset is offset from the first subset along a length of the forearm section of the band, and vibration motors of the first subset are offset or staggered by half an increment in relation to the vibration motors of the second subset.

In some cases where the second set of vibration motors includes a first subset of vibration motors and a second subset of vibration motors, the method comprises: distributing a first subset of vibration motors in increments in a first row disposed circumferentially about the upper arm section of the band; and distributing a second subset of the vibration motors in the increments in a second row disposed circumferentially about the upper section of the band, wherein the second subset is offset from the first subset along a length of the upper arm section of the band, and vibration motors of the first subset are offset or staggered by half an increment in relation to the vibration motors of the second subset.

In some cases, the method further includes connecting a plurality of light emitting diodes to the band, and activating via the processor the light emitting diodes that illuminate to guide the user along the trajectory path. In other cases, the method includes connecting a plurality of light emitting diodes connected to the band, and activating via the processor the light emitting diodes that illuminate to guide the user when the user deviates from the trajectory path.

In some cases where guidance is active instruction, the method comprises activating via the processor the one or more of the vibration motors to guide the user along the trajectory path. In other cases where guidance is passive correction, the method includes activating via the processor the one or more of the vibration motors to guide the user when the user deviates from the trajectory path.

These and other purposes, goals and advantages of the present application will become apparent from the following detailed description of example embodiments read in connection with the accompanying drawings.

BRIEF DESCRIPTION OF THE DRAWINGS

Some embodiments are illustrated by way of example and not limitation in the figures of the accompanying drawings in which:

FIG. 4 illustrates another example wearable device that is capable of actively or passively teaching, correcting, and monitoring a movement pattern of an exercise in three dimensions to facilitate intuitive learning and consistent repeating of the movement pattern of an exercise;

FIG. 5 illustrates the wearable device of FIG. 4 disposed about the forearm and/or upper arm of a user;

DETAILED DESCRIPTION

A system and method of providing contextualized information shaping for display and control functionality are disclosed herein. In the following description, for the purposes of explanation, numerous specific details are set forth in order to provide a thorough understanding of example embodiments or aspects. It will be evident, however, to one skilled in the art, that an example embodiment may be practiced without all of the disclosed specific details.

Figure 1A:
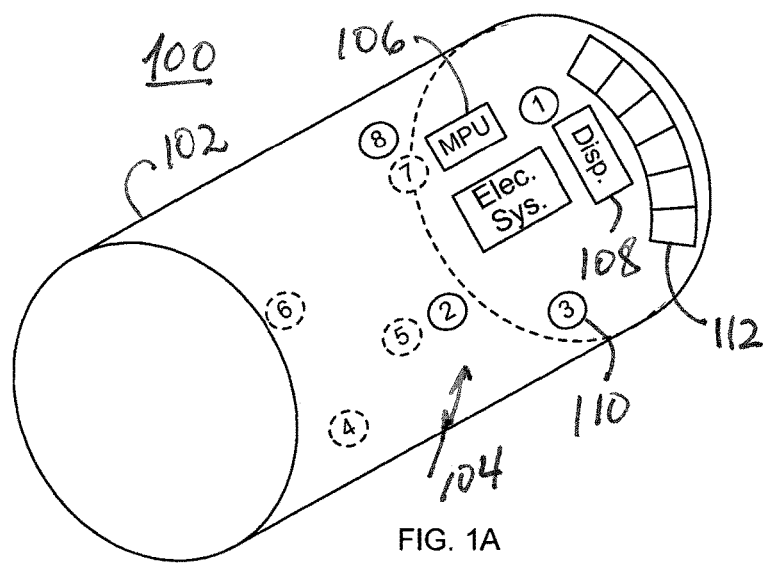
FIGS. 1A and 2A illustrate perspective views of an example wearable device that is capable of actively or passively teaching, correcting, and monitoring a movement pattern of an exercise in three dimensions to facilitate intuitive learning and consistent repeating of the movement pattern of an exercise.
Figure 2A:
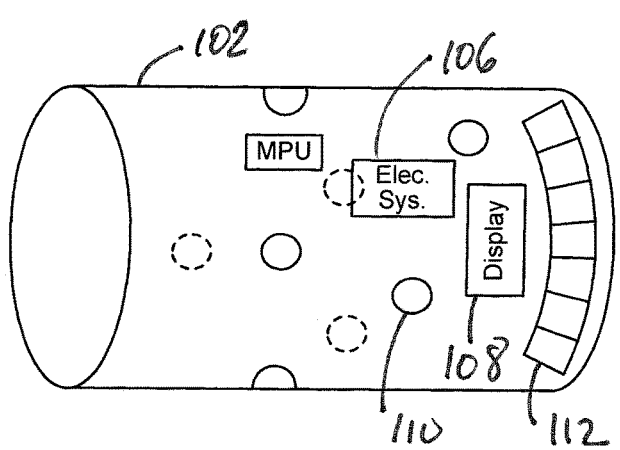

FIGS. 1A and 2A illustrate an example wearable device 100 that is capable of actively or passively teaching, correcting, and monitoring a movement pattern of an exercise in three dimensions to facilitate intuitive learning and consistent repeating of the movement pattern of an exercise. The wearable device 100 includes an elastic band 102 and an electronics system 104, which will be described in detail with reference to FIG. 6.

The elastic band 102 is configured to be removably disposed on a wrist or a forearm of a user (e.g., having a wristband or forearm band form factor), and further configured to support or incorporate the electronics system 104. The elastic band 102 can be made of polyester, spandex, nylon, cotton, or any combination thereof.

For example, latex and lycra can be blended with cotton or other natural or synthetic materials to provide the elastic band 102 that can removably fit the user's wrist and/or forearm, be snuggly disposed during exercise, and yet provide comfort and freedom of movement to the user during exercise.

Other materials and combinations of materials, whether natural or synthetic, can be similarly used to provide the elastic band 102 that can be removably disposed and can removably incorporate and support the electronics system 104, e.g., rayon, elastane, neoprene rubber. Moreover, any other known materials or materials yet to be developed can be used for the elastic band 102, either singularly, or in any combination, including one or more combinations with materials listed herein.

Components of the electronics system 104 can be woven into or onto the elastic band 102. Additionally or alternatively, the components of the electronics system 104 can be secured to the elastic band 102 by stitching, gluing, and/or other ways (e.g., hook-and-loop, and snap-on clasps). Moreover, one or more pockets can be provided on or in the elastic band 102 that can removably secure the components of the electronics system 104.

The electronics system 104 can include, among other components, one or more motion processing units (MPUs) 106, a plurality of vibration motors 108, a plurality of light emitting diodes (LEDs) 110, and a display device 112. These and other components of the electronics system 104 will be described hereinafter with reference to FIG. 6.

Figure 1B:
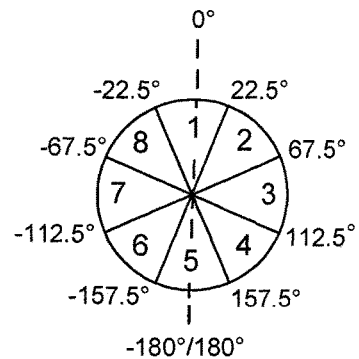
FIG. 1B illustrates example location and/or distribution of vibration motors about the wearable device illustrated in FIG. 1A.

FIG. 1B illustrates an example distribution or placement of a plurality of vibration motors 110 about wearable device 100 illustrated in FIGS. 1A and 2A. One such distribution can include a set of eight (8) vibration motors in total, with a first subset of four (4) vibration motors 1, 3, 5, and 7 distributed evenly (90° increments) in a first row circumferentially about the wearable device 100, and a second subset of four (4) vibration motors 2, 4, 6, and 8 distributed evenly (90° increments) in a second row circumferentially about the wearable device 100, wherein the second subset is offset from the first subset along the length of the wearable device 100, and the vibration motors of the first subset are offset or staggered by half an increment (45°) in relation to the vibration motors of the second subset. For example, the second subset of vibration motors can be offset from the first subset of vibration motors within a range of 2 mm-5 mm (e.g., 3 mm). The offset can be any value within the range, or can be larger (e.g., 6 mm) or smaller (e.g., 2 mm) than any value in the aforementioned range. The foregoing offsets are not an exhaustive list, but rather are presented to allow the user to differentiate between the first and second rows of vibration motors.

Accordingly, vibration can be provided using one or more of the vibration motors in 45° increments circumferentially about the wearable device 100. As illustrated in FIG. 1B, 0° can be lined up with the front of the wearable device 100, e.g., at an approximate center of the display 110 and/or of the LEDs 112, and −180°/180° can be lined up with the back of the wearable device 100. Accordingly, vibration motors 1, 3, 5, and 7 of the first set can be disposed at 22.5°, 112.5°, −157.5°, and −67.5°, and vibration motors 2, 4, 6, and 8 of the second set can be disposed at 67.5°, 157.5°, −112.5°, and −22.5°.

It should be noted that vibration motors 110 can be disposed circumferentially about the wearable device 100 in one or more other placements or distributions. More specifically, more or fewer vibration motors can be provided to improve accuracy of vibration and guidance provided by the wearable device 100. Moreover, more or fewer rows can be disposed circumferentially about the wearable device 100. It is also possible to provide various distributions or placements of the plurality of vibration motors, such as one row, two-row 1-1 zig-zag, three rows with 2-1 placement, uneven rows of vibration motors, two-row 3-3 zig-zag, or simply a scattered distribution of the vibration motors. What is important to note is that the distribution of vibration motors should facilitate three-dimensional guidance provided by the wearable device 100 to the user in connection with active instruction and/or passive correction related to movements for an exercise.

Figure 2B:
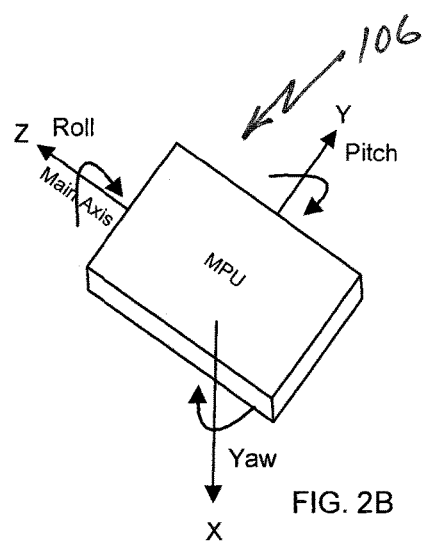
FIG. 2B illustrates example motion processing unit (MPU) of the wearable device illustrated in FIGS. 1A and 1B.

FIG. 2B illustrates example motion processing unit (MPU) 106 of the wearable devices 100 illustrated in FIG. 1A (similarly the wearable device 400 illustrated in FIG. 1B). The MPU 106 has a main axis Z, and is disposed in relation to the wearable device 100 so that the Z-axis extends along a length of the wearable device 100. The MPU 106 is configured to determine roll of the wearable device 100 about the Z-axis, pitch of the wearable device 100 about the Y-axis, and Yaw of the wearable device 100 about the X-axis. The positive direction for each of the axes is determined by the right hand rule, e.g., wherein rotation in the clockwise direction is considered positive.

As will be described in detail with reference to flowcharts illustrated in FIGS. 8 and 9, the roll, pitch, and yaw data can be used to determine a front direction and top side of the wearable device 100, 400, as well as an angle of elevation (AoE) of the wearable device 100, 400, in connection with active instruction and/or passive correction related to specific movements of an exercise.

Figure 3:
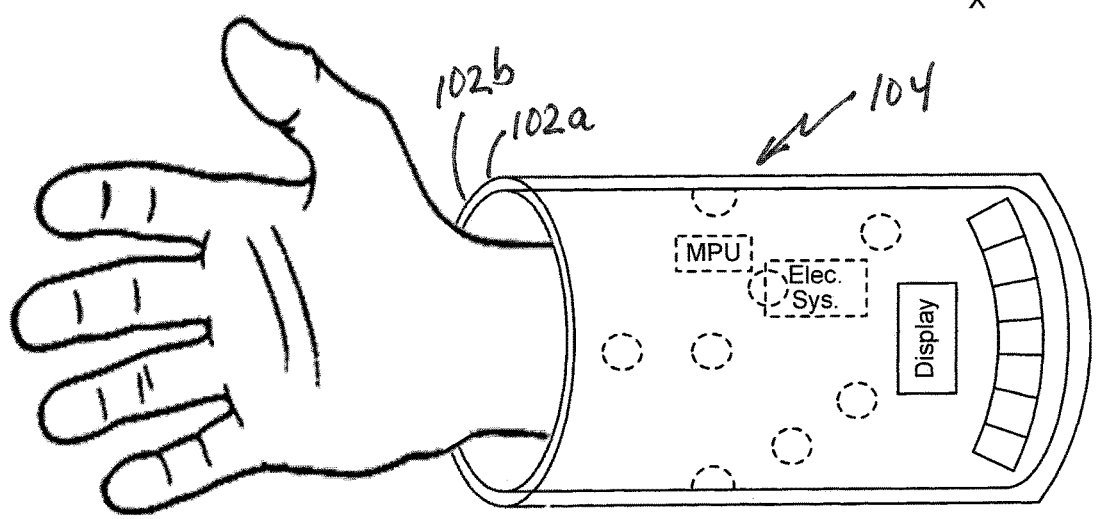
FIG. 3 illustrates the wearable device of FIG. 1A disposed about the wrist and/or forearm of a user.

FIG. 3 illustrates the wearable device 100 of FIGS. 1A and 2A disposed about the wrist and/or forearm of a user. The display 108 and LEDs 112 are disposed approximately centrally in relation to the inner wrist and/or forearm of the user, e.g., with the palm supinated or facing up (e.g., assuming user's forearm is approximately parallel to the floor). Other placements are also possible, e.g., with user's palm facing a neutral position (e.g., assuming user's forearm is approximately parallel to the floor) or user's palm pronated or facing down (e.g., assuming user's forearm is approximately parallel to the floor).

As illustrated in FIGS. 1A and 2A, the elastic band 102 can be made of a single ply construction. Moreover, as illustrated in FIG. 3, the elastic band 102 can be made of a two-ply construction including outer ply 102a and inner ply 102b, in which most of the components of the electronic system 104 are disposed between the plies 102a, 102b. As discussed hereinabove with reference to the single-ply construction in FIGS. 1A, 2A, components of the electronics system 104 can be woven between the plies 102a, 102b of the elastic band 102. It should be noted that the elastic band 102 is not drawn to scale with respect to the wrist and/or forearm of a user on which it is disposed. More specifically, the elastic band 102 is stretchable and is configured to fit tightly and/or closely about the wrist and/or forearm of a user.

Additionally or alternatively, the components of the electronics system 104 can be secured to one or more of the plies of elastic band 102 by stitching, gluing, and/or other ways (e.g., hook-and-loop, and snap-on clasps). Additionally or alternatively, one or more pockets can be provided on or in the elastic band 102 that can removably secure the components of the electronics system 104. The plies 102a, 102b can also be secured together in a similar fashion, e.g., stitching, gluing, and/or other ways (e.g., hook-and-loop).

FIG. 4 illustrates another example wearable device 400 that is capable of actively or passively teaching, correcting, and monitoring a movement pattern of an exercise in three dimensions to facilitate intuitive learning and consistent repeating of the movement pattern of an exercise. The wearable device 400 includes an elastic band 402 and an electronics system 104, which will be described in detail with reference to FIG. 6.

Unlike elastic band 102, elastic band 402 (e.g., having an arm sleeve form factor) is configured to be removably disposed on a combination of forearm and upper arm of a user, and further configured to support or incorporate the electronics system 104. As discussed in relation to elastic band 102, elastic band 104 can be made of polyester, spandex, nylon, cotton, rayon, elastane, neoprene rubber, or any combination thereof. Similarly, any other known materials or materials yet to be developed can be used for the elastic band 402, either singularly, or in any combination, including one or more combinations with materials listed herein.

More specifically, the elastic band 402 can have a forearm section 404, and an upper arm section 406. In this embodiment, each of the sections 404, 406 of the wearable device 400 can include one or more MPUs 106a-106c, and respective sets of vibration motors 110a-110c. For example, the forearm section 404 can include MPUs 106a, 106b, respective vibration motor sets 110a, 110b, display 108, and LEDs 112, while the upper arm section 406 can include MPU 106c and respective vibration motor sets 110c.

The three MPUs 106a-106c can be used to provide improved guidance to the user based on discretely determined location/movement data of the forearm (at wrist and elbow) and the upper arm. The MPUs 106a-106c are disposed in relation to the wearable device 400 in similar fashion to the placement of MPU 106 described in relation to FIGS. 2A and 2B, wherein the Z-axis extends along a length of the wearable device 400.

Moreover, the display 108 and LEDs 112 can be disposed in a convenient location of the wearable device 400 for better presentation to or convenient use by the user. For example, the display 108 can be disposed midway along the length of the forearm section 404 and the LEDs 112 can be disposed at the extent along the length of the forearm 404, approximately at the elbow.

Each of the respective vibration motor sets 110a-110c can have a similar or a different distribution and/or placement of the vibration motors 110 about the wearable device 400 to the distribution and/or placement of the vibration motor sets 110 described hereinabove with reference to wearable device 100 illustrated in FIGS. 1A and 2A.

For example, in one embodiment already described herein, vibration motor set 110a can include eight (8) vibration motors in total, with a first subset of four (4) vibration motors 1, 3, 5, and 7 distributed evenly (90° increments) in a first row circumferentially about the wearable device 400, and a second subset of four (4) vibration motors 2, 4, 6, and 8 distributed evenly (90° increments) in second row circumferentially about the wearable device 400, wherein the second subset is offset from the first subset along the length of the wearable device 400, and the vibration motors of the first subset are offset or staggered by half an increment (45°) in relation to the vibration motors of the second subset. Other vibration motor sets 110b and 110c can be distributed similarly to or differently from the vibration motor set 110a, as described hereinabove with reference to FIGS. 1A and 2A.

In the description hereinbelow of FIGS. 8 and 9, the roll, pitch, and yaw data of the individual MPUs 106a-106c can be integrated to determine more accurately the front direction and top side of each of the wearable device 400, as well as the angle of elevation (AoE) of the wearable device 400, in connection with active instruction and/or passive correction related to specific movements of an exercise.

FIG. 5 illustrates the wearable device 400 of FIG. 4 disposed about the forearm and/or upper arm of a user. The display 108 and LEDs 112 are disposed approximately centrally in relation to the inner wrist and/or forearm of the user, e.g., with the palm supinated or facing up (e.g., assuming user's forearm is approximately parallel to the floor). Other placements are also possible, e.g., with user's palm facing a neutral position (e.g., assuming user's forearm is approximately parallel to the floor) or user's palm pronated or facing down (e.g., assuming user's forearm is approximately parallel to the floor).

As illustrated in FIG. 4, the elastic band 402 can be made of a single ply construction. Moreover, as illustrated in FIG. 5, the elastic band 402 can be made of a two-ply construction including outer ply 402a and inner ply 402b, in which most of the components of the electronic system 104 are disposed between the plies 402a, 402b. As discussed hereinabove with reference to the single-ply construction in FIG. 4, the components of the electronics system 104 can be woven between the plies 402a, 402b of the elastic band 402.

Additionally or alternatively, the components of the electronics system 104 can be secured to one or more of the plies 402a, 402b of elastic band 402 by stitching, gluing, and/or other ways (e.g., hook-and-loop and snap-on clasps). Moreover, one or more pockets can be provided on, in, or between plies 402a, 402b of the elastic band 402 that can removably secure the components of the electronics system 104. The plies 402a, 402b can also be secured together in a similar fashion, e.g., stitching, gluing, and/or other ways (e.g., hook-and-loop and snap-on clasps). It should be noted that the elastic band 402, and/or one or more of its component sections 404, 406, is not drawn to scale with respect to the forearm and/or upper arm of a user on which it is disposed. More specifically, the elastic band 402, and/or one or more of its component sections 404, 406, is stretchable and is configured to fit tightly and/or closely about the forearm and/or upper arm of a user.

Figure 6:
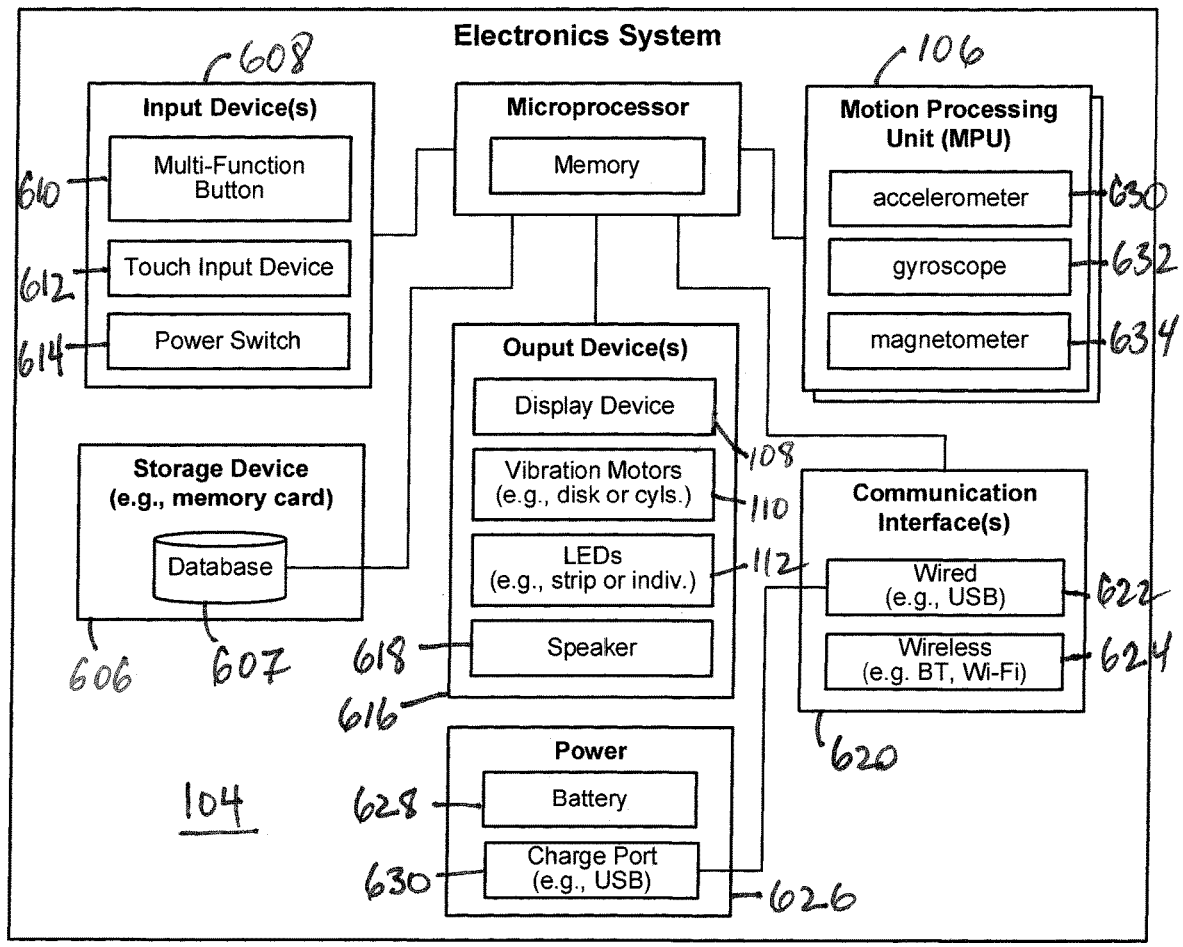
FIG. 6 illustrates a block diagram of an example electronics system of the example wearable devices illustrated in FIGS. 1A and 4.

FIG. 6 illustrates a block diagram of an example electronics system 104 of the example wearable devices 100, 400 illustrated in FIGS. 1A, 2A and 4. The electronics system 104 is configured to provide guidance, such as activate instruction and/or passive correction, for a selected movement or exercise (e.g., arm extension/flexion (bicep curl), shoulder abduction/adduction, wrist pronation/supination, leg flexion/extension (leg curl), as well as one or more other movements or exercises).

The electronics system 104 includes a microprocessor 602 having memory 604, removable storage device 606 having database 607, input devices 608, output devices 616, communication interfaces 620, power components 626, and one or more motion processing units 106.

The microprocessor 602 is interconnected to the storage device 606, input devices 608, output devices 616, motion processing unit 106, and communication interfaces 620 in order to provide guidance to a user, such as activate instruction and/or passive correction, for a selected movement or exercise. The microprocessor 602 can execute the methods, functions, or other logic as described herein.

The memory 604 and/or storage database 606 (e.g., removable memory card) include computer instructions (e.g., software) that embody one or more of the methods, functions, or other logic as described herein. The instructions may reside completely, or at least partially, within the memory 604, storage 606 (e.g., in database 607), and/or within the processor 602 during execution of the instructions by the processor 602. The processor 602, memory 604, and storage 606 can also include computer-readable media to store instructions.

The storage device 606 is configured to store various data and/or information related to certain movements or exercises (e.g., in the database 607), as described herein to facilitate the methods, functions, and/or other logic as described in this disclosure. For example, the storage device 306 can store not only computer instructions related to providing guidance for certain movements or exercises, but also can store user data related to the performance of these movements or exercises, such as statistics related to user execution of the movement or exercise, including repetition count, average time related to repetitions and total exercise time, as well as user error(s) in the execution of the movement or exercise.

The input devices 608 receive various data and information described herein to facilitate the methods, functions, and/or other logic as described in this disclosure. The input devices 608 include a multi-function button 610, a touch input device 612, and a power switch 614. The foregoing input devices 608 enable the user to provide different types of input, and select and/or actuate various movement and/or exercise functionality, methods, functions and/or other logic as described herein.

The multi-function button 610 can include various buttons or switches that can be depressed, toggled, or otherwise actuated by the user so that the electronics system 104 can receive various user inputs and/or selections related to the performance of various movements and/or information related to performed movements (e.g., statistics). The touch input device 612 can include one or more touch devices (e.g., touchscreens) that can receive various inputs from and selections from the user. Touch input received by the touch input device 612 can be used to swipe through screens to adjust settings and thresholds, start and stop exercises, and view usage data. The power button 614 can be toggled to switch the electronics system 104 on/off.

A motion processing unit (MPU) 106 is dedicated to determining motion-related data of the wearable devices 100, 400. One or more MPUs can be provided in a wearable device, e.g., wearable devices 100, 400. Each MPU 106 includes an accelerometer 620, gyroscope 632, and magnetometer 634. The MPU 106 is configured to determine roll of the wearable device in about the Z-axis, pitch of the wearable device in about the Y-axis, and Yaw of the wearable device about the X-axis, as described herein with reference to FIG. 2B. As used herein, the accelerometer 630 can determine an angle of elevation, the gyroscope 632 can determine an angle of rotation, and a magnetometer 634 can determine a compass direction. The accelerometer 630 and the gyroscope 632 can be used together to determine the orientation in space of the MPU 106, and thus by extension the orientation of the wearable device 100, regardless of the compass direction the MPU 106 is facing. The magnetometer 634 can be used to determine the user's starting front direction, and thereafter the user's deviation from that front direction.

The output devices 336 output various data, indications, and information described herein to facilitate the methods, functions and/or other logic as described in this disclosure. The output devices 336 include display 108, vibration motors 110, light emitting devices (LEDs) 112, and/or speaker 618.

The display 108 can be a liquid crystal display (LCD), organic light emitting diode (OLED) (flexible or not), or another display technology. The vibration motors 110 can be any electronic and/or sonic disks or cylinders that can oscillate and/or provide vibration. The LEDs 112 can include a variety of different LEDs, which can be individually provided or provided as part of an LED strip. The speaker 618 can be any speaker of various technologies to produce audible sounds related to the operation of the wearable devices 100, 400.

Figure 7:
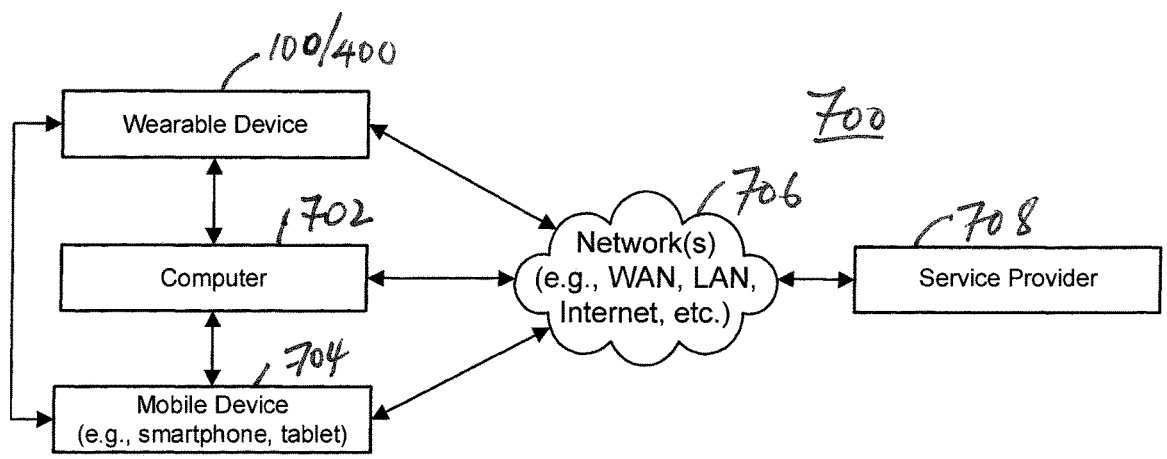
FIG. 7 illustrates an example system that, among other things, provides integration and communication of the wearable devices with a computer, mobile device, and service provider.

The communication interfaces 620 provide for the interconnection and communication of the electronics system 104 with a computer 702, mobile device 704, and/or service provider 708 of a system 700, as described herein with reference to FIG. 7. The communication interfaces 620 can include a wired communication network interface 622 and wireless communication network interface 624.

The wired communication network interface 622, which can include a USB interface, enables the electronics system 104 to communicate with external devices and systems, using a wired connection such as via USB. The wireless communication network interface 624 enables the electronics system 104 to communicate with external devise and systems, using a wireless connection such as Bluetooth and Wi-Fi.

The power components 626 include a rechargeable battery 628 and charge port 630. The rechargeable battery provides power to the components of the electronics systems 104. The charge port (e.g., USB port) is part of the wired communication interface 622, and provides charging capability to recharge the battery of the electronics system 104.

FIG. 7 illustrates an example system 700 that, among other things, provides integration and communication of the electronics system 104 of the wearable devices 100, 400 with a computer 702, mobile device 704, and service provider 708.

While communication among the wearable device 100, the computer 702, and/or mobile device 704 can be performed via a direct connection, such as via wired communication interface 622 (e.g., USB) or wireless communication interface (e.g., Bluetooth), or network connection via a network 706, communication with the service provider 708 is generally via a network connection 706, e.g., via WAN, LAN, or Internet.

Particular movements or exercises desired for execution and/or guidance via the wearable device 100, 400 can be purchased and/or downloaded using the computer 702 and/or the mobile device 704 from the service provider 708 over network 706. Thereafter, the downloaded movements or exercises can be provided from the computer 702 and/or the mobile device 704 to the electronics system 104, e.g., stored into storage device 606 (e.g., written to database 607).

The computer 702 and/or the mobile device 704 can be integrated with the electronics system 104 during and/or after the movement or exercise as well.

For example, guidance provided to the user by the output devices 616 of wearable devices 100, 400 during user's movement can be provided and replicated and/or displayed by the computer 702 and/or mobile device 704 on their display device (not shown). In such cases, the display 108 and/or LEDs 112 can be, but do not have to be, omitted from the wearable devices 100, 400.

Similarly, statistics related to the movement or exercise, generated during the movement or exercise and/or at conclusion of the movement or exercise, can also be provided to and displayed by the computer 702 and/or mobile device 704 on their associated display device (not shown). This information can include a summary percentage accuracy for all repetitions of a movement completed or a more granular summary percentage accuracy (e.g., for each repetition or step of a movement). The information can also include x, y, and z values for intervals of the movement or exercise (e.g., an interval can be every 0.1 seconds). This information could be presented to or viewed by the user overtime to observe how user's movement is changing in relation to the exercise movement pattern, as well as how user's movement accuracy is improving in relation to the exercise movement pattern.

Figure 8:
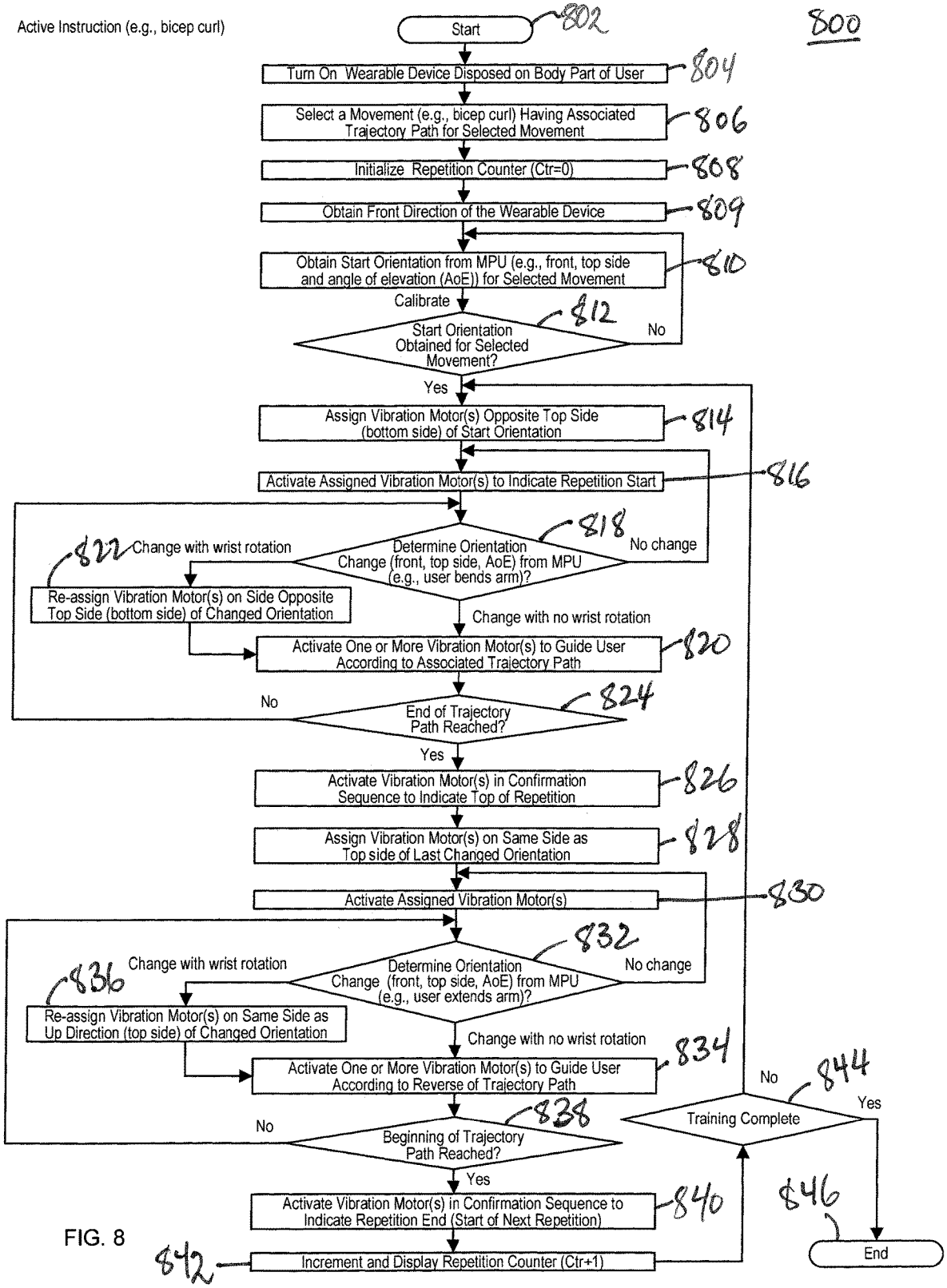
FIG. 8 is a flowchart that illustrates an example method of providing active instruction in accordance with FIGS. 1-7.

FIG. 8 is a flowchart that illustrates an example method 800 of providing active instruction in accordance with FIGS. 1-7.

The example method 800 starts at operation 802 where the user disposes the wearable device 100, 400 on a body part of the user, such as placing wearable device 100 on the wrist and/or forearm, or placing wearable device 400 on the combination of the forearm and upper arm.

At operation 804, the user turns on the electronics device 104, e.g., by using power switch 614. At operation 806, a movement is selected (e.g., bicep curl), such as via user input provided using multi-function button 610 and/or touch input device 612, for guidance of the user along a trajectory path associated with the selected movement. At operation 808, a repetition counter is initialized for the selected movement or exercise (Ctr=0).

At operations 809-812, a calibration is performed in order to provide active instruction in accordance with FIGS. 1-7. More specifically, at operation 809, an initial calibrated front direction of the MPU 106 is obtained (e.g., the front direction is a direction that the user will face during the exercise). The calibrated front direction is used in order to further calibrate the device 100, 400 at operations 810-812, as described hereinbelow. In order to obtain the calibrated front direction, the user extends and holds the user's arm in front or at the side of the user's body with the front of the wearable device 106, 400 (e.g., display 108, LEDs 112) pointing in a direction that the user is facing. After the user's arm has been steady for a period of time (e.g., 5 seconds), values returned by the magnetometer 634 of the MPU 106 over this period of time are averaged, and a resulting value is considered the calibrated front direction of the MPU 106, and by extension the front direction of wearable device 106, 400, for the duration of a movement or exercise (e.g., this value is also considered as rotation value about the x-axis as illustrated in FIG. 2B).

At operations 810-812, the calibration continues in order to obtain a starting orientation of the wearable device 100, 400 from the at least one MPU 106 based on the obtained front direction. The orientation includes a current front direction, a top side, as well as an angle of elevation (AoE). The roll about the Z-axis, pitch about the Y-axis, and Yaw about the X-axis are used to obtain these data. More particularly for a bicep curl, a user would extend the arm down with palm out and away from the body for a predetermined amount of time (e.g., 5 seconds). The roll, pitch, and yaw would be initialized to determine or form a starting orientation.

More specifically, the current front direction of the starting orientation is derived from the magnetometer 634, and is effectively a compass direction toward which the z-axis is pointing. The top side of the starting orientation is derived from the accelerometer 630 and the gyroscope 632, and is effectively a side of the wearable device 100, 400 that faces upwards. The angle of elevation of the starting orientation is derived from the accelerometer 630, and is effectively an angle that the z-axis of the wearable device 100, 400 deviates from a horizontal plane (e.g., −90° degrees is downwards, +90° degrees is upwards).

At operation 812, a determination is made as to whether a starting orientation was obtained successfully for the selected movement. If the starting orientation was not obtained at operation 812, then the method continues at operation 810 to again perform a calibration in order to obtain a starting orientation of the wearable device 100, 400 from the at least one MPU 106.

If the starting orientation is obtained successfully at operation 812, then the method 800 continues at operation 814, where one or more vibration motors are assigned opposite the top side (e.g., bottom side of the wearable device 100, 400) of the starting orientation.

At operation 816, the assigned vibration motors are activated in a sequence that indicates a start of a repetition. At operation 818, a determination is made based on data from MPU 106 as to whether there is an orientation change (e.g., front, top side, angle of elevation).

If it is determined that there is no change of orientation at operation 818, the method 800 continues at operation 816, where the assigned vibration motors are activated in the sequence that indicates a start of a repetition.

If it is determined that there is an orientation change with wrist rotation at operation 818, the method 800 continues at operation 822, wherein vibration motors of the wearable devices 100, 400 that were previously not assigned to the bottom side are now re-assigned to the bottom side because of the rotation, and other vibration motors are re-assigned accordingly. More specifically, re-assignments of the vibration motors can be made based on FIG. 1B, wherein 0° can be lined up with the present top side of the wearable device 100, 400, and −180°/180° can be lined up with the present bottom side of the wearable device 100, 400. The method 800 then continues at operation 820.

However, if it is determined that there is orientation change with no wrist rotation at operation 818, the method 800 then continues at operation 820. At operation 820, one or more of the vibration motors that were assigned at operation 816 or re-assigned at operation 822, as well as any one or more additional vibration motors as may be necessary, are activated to guide the user according to the associated trajectory path.

Thereafter, at operation 824 a determination is made as to whether an end of the trajectory path has been reached (e.g., top of the bicep curl). If it is determined that it is not the end of the trajectory path, the method 800 continues by iterating operations 818-824 until the trajectory path is reached. If at operation 824, it is determined that the end of the trajectory path was reached, the method 800 continues at operation 826, where the re-assigned vibration motors are activated in a sequence that indicates the top of the repetition (e.g., top of the bicep curl).

At operation 828, one or more vibration motors are assigned on the top side of the wearable device 100, 400 of the last changed orientation. At operation 830, one or more of the assigned vibration motors are activated in a sequence that guides the user according to a reverse of the associated trajectory path.

At operation 832, a determination is made based on data from MPU 106 as to whether there is an orientation change (e.g., front, top side, angle of elevation).

If it is determined that there is no change of orientation at operation 832, the method 800 continues at operation 830, where the assigned vibration motors are activated in the sequence that guides the user according to a reverse of the associated trajectory path.

If it is determined that there is an orientation change with wrist rotation at operation 832, the method 800 continues at operation 836, wherein vibration motors of the wearable devices 100, 400 that were previously not assigned to the same side as the top side are now re-assigned to the top side because of the rotation, and other vibration motors are re-assigned accordingly. More specifically, re-assignments of the vibration motors can be made based on FIG. 1B, wherein 0° can be lined up with the present top side of the wearable device 100, 400, and −180°/180° can be lined up with the present bottom side of the wearable device 100, 400. The method 800 then continues at operation 834.

However, if it is determined that there is an orientation change with no wrist rotation at operation 832, the method 800 then continues at operation 834. More specifically, re-assignments of the vibration motors can be made based on FIG. 1B, wherein 0° can be lined up with the top of the wearable device 100, 400, and −180°/180° can be lined up with the bottom of the wearable device 100, 400.

At operation 834, one or more of the vibration motors that were assigned at operation 828 or re-assigned at operation 836 are activated to guide the user according to the associated reverse of the trajectory path.

Thereafter, at operation 838 a determination is made as to whether an end of the reverse of the trajectory path, or whether a beginning of the trajectory path, has been reached (e.g., bottom of the bicep curl). If it is determined that it is not the end of the reverse trajectory path, the method 800 iterates operations 832-838 until the end of the reverse trajectory path is reached. If at operation 838, it is determined that the end of the reverse trajectory path was reached, the method continues at operation 840, where the assigned vibration motors are activated in a sequence that indicates an end of a current repetition and a start of a next repetition (e.g., bottom of the bicep curl).

At operation 842, the repetition counter is incremented (Ctr+1) and displayed to the user to indicate the number of completed repetitions. At operation 844, a determination is made as to whether the training (e.g., active instruction or guidance) is complete. This could be achieved by reaching a present number of repetitions for the movement or be a selection entered by the user, such as via the multi-function button 610 or touch input device 612.

If it is determined at operation 844 that the training is complete, the method 800 ends at operation 846. However, if it is determined at operation 844 that training is not complete, the method 800 continues by iterating operations 814-844 until completion of the training.

In view of the foregoing, the example method 800 provides active instruction for a selected movement or exercise. More specifically, the user could use the wearable device 100, 400 in an active instruction mode to learn optimal movement pattern for movement or exercise. In this regard, active instruction can be provided with continuous or intermittent vibration with a goal of actively instructing the user with vibration along the correct trajectory path associated with the movement or exercise.

The example method 800 thus provides three-dimensional active instruction so the user can know how to move their body. By activating appropriate vibration motors in relation to the trajectory path in different sequences, the wearable device 100, 400 can inform the user to undergo various translational and/or rotational movements along the trajectory path, as the user learns the movement pattern for the movement or exercise.

Figure 9A:
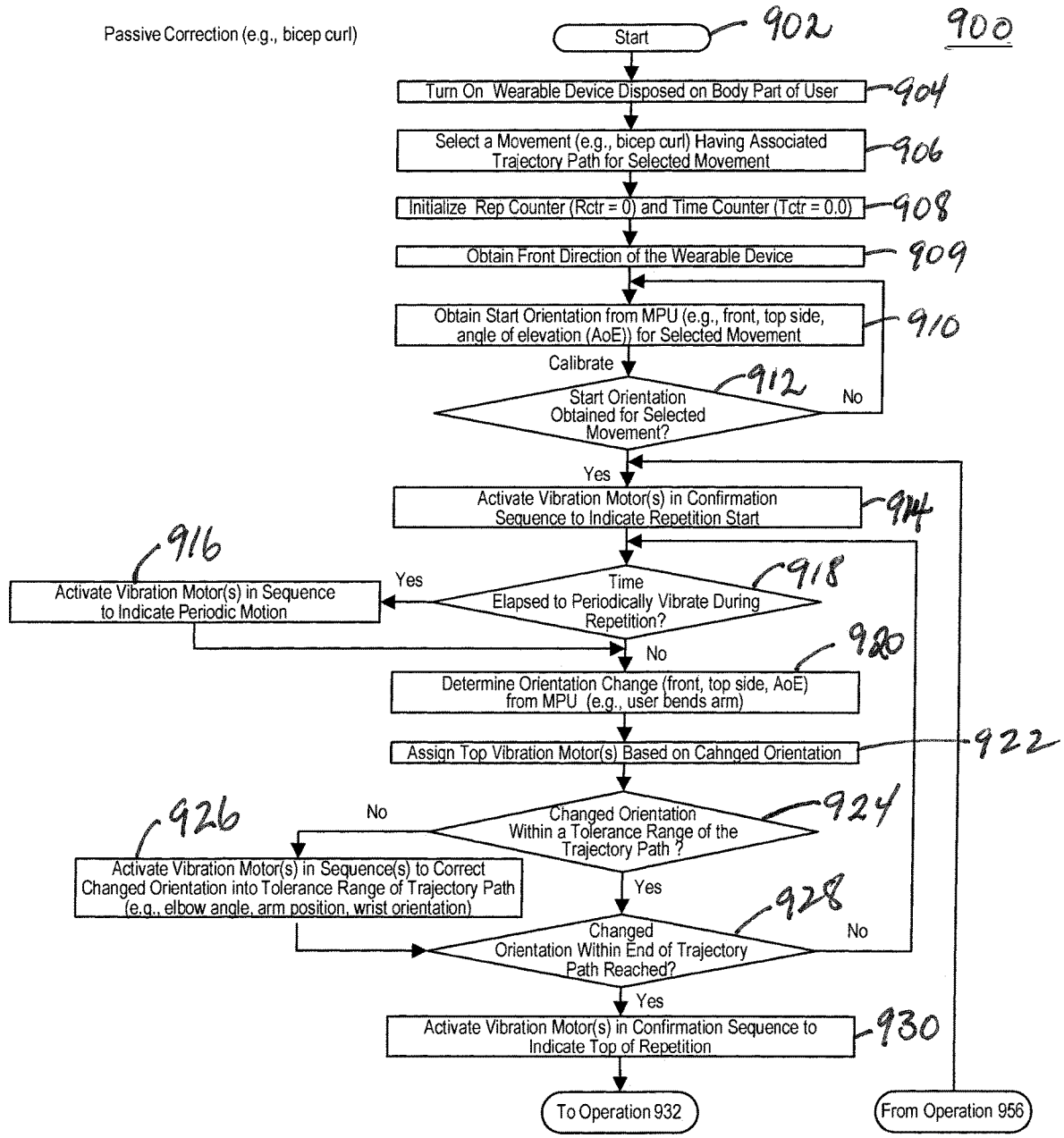
FIGS. 9A and 9B are a flowchart that illustrates an example method of providing passive correction in accordance with FIGS. 1-7.
Figure 9B:
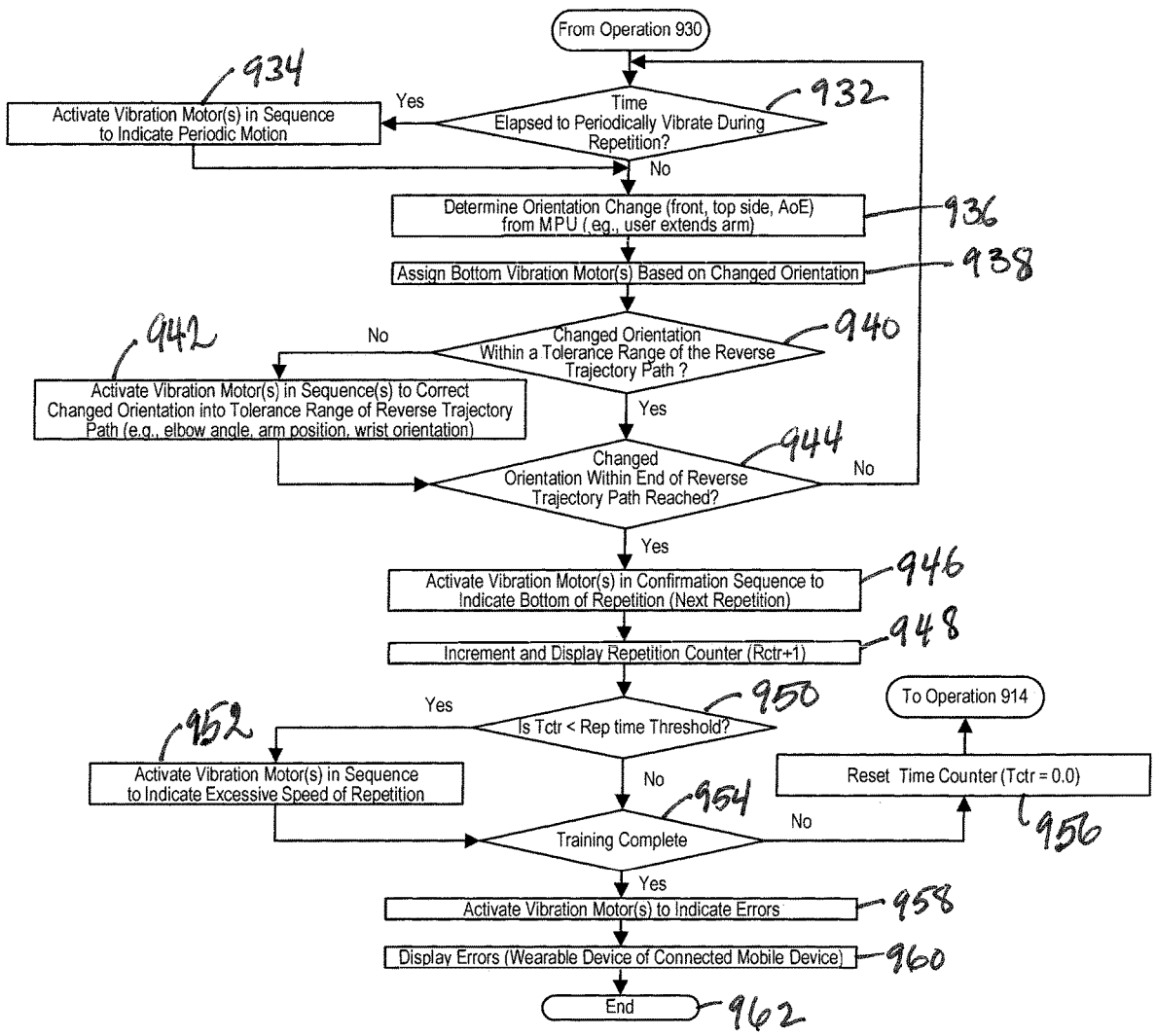

FIGS. 9A and 9B are a flowchart that illustrates an example method 900 of providing passive correction in accordance with FIGS. 1-7.

The example method 900 starts at operation 902 where the user disposes the wearable device 100, 400 on a body part of the user, such as placing wearable device 100 on the wrist and/or forearm, or placing wearable device 400 on the combination of the forearm and upper arm.

At operation 904, the user turns on the electronics device 104, e.g., by using power switch 614. At operation 906, a movement is selected (e.g., bicep curl), such as via user input provided using multi-function button 610 and/or touch input device 612, for correction of the user along a trajectory path associated with the selected movement. At operation 908, a repetition counter and repetition time counter are initialized for the selected movement or exercise (Rctr=0 and Tctr=0.0).

At operations 909-912, a calibration is performed in order to provide active instruction in accordance with FIGS. 1-7. More specifically, at operation 909, an initial calibrated front direction of the MPU 106 is obtained (e.g., the front direction is a direction that the user will face during the exercise). The calibrated front direction is used in order to further calibrate the device 100, 400 at operations 810-812, as described hereinbelow. In order to obtain the calibrated front direction, the user extends and holds the user's arm in front or at the side of the user's body with the front of the wearable device 106, 400 (e.g., display 108, LEDs 112) pointing in a direction that the user is facing. After the user's arm has been steady for a period of time (e.g., 5 seconds), values returned by the magnetometer 634 of the MPU 106 over this period of time are averaged, and a resulting value is considered the calibrated front direction of the MPU 106, and by extension the front direction of wearable device 106, 400, for the duration of a movement or exercise (e.g., this value is also considered as rotation value about the x-axis as illustrated in FIG. 2B).

At operations 910-912, the calibration continues in order to obtain a starting orientation of the wearable device 100, 400 from the at least one MPU 106 based on the obtained front direction. The orientation includes a current front direction, a top side, as well as an angle of elevation (AoE). The roll about the Z-axis, pitch about the Y-axis, and Yaw about the X-axis are used to obtain these data. More particularly for a bicep curl, a user would extend the arm down with palm out and away from the body for a predetermined amount of time (e.g., 5 seconds). The roll, pitch, and yaw would be initialized to determine or form a starting orientation.

More specifically, the current front direction of the starting orientation is derived from the magnetometer 634, and is effectively a compass direction toward which the z-axis is pointing. The top side of the starting orientation is derived from the accelerometer 630 and the gyroscope 632, and is effectively a side of the wearable device 100, 400 that faces upwards. The angle of elevation of the starting orientation is derived from the accelerometer 630, and is effectively an angle that the z-axis of the wearable device 100, 400 deviates from a horizontal plane (e.g., −90° degrees is downwards, +90° degrees is upwards).

At operation 912, a determination is made as to whether a starting orientation was obtained successfully for the selected movement. If the starting orientation was not obtained at operation 912, then the method continues at operation 810 to again perform a calibration in order to obtain a starting orientation of the wearable device 100, 400 from the at least one MPU 106.

If the starting orientation is obtained successfully at operation 912, then the method 900 continues at operation 914, where one or more vibration motors are activated in a sequence that indicates a start of a repetition.

At operation 918 a determination is made as to whether a time period (e.g., every second, shorter period, or longer period) has elapsed (from start of the movement or completion of last time period of the movement) to periodically vibrate vibration motors in a sequence during a repetition. If it is determined that time period has elapsed at operation 918, then at operation 916 vibration motors are activated in a sequence to indicate periodic motion associated with the movement or exercise. If it is determined that time period has not elapsed at operation 918, the method 900 continues at operation 920.

At operation 920, a determination is made based on data from MPU 106 regarding an orientation change (e.g., front, top side, angle of elevation) of the wearable device 100, 400, such as when a user bends the arm to perform arm flexion (e.g., bicep curl). At operation 920, top side vibration motors of the wearable devices 100, 400 are assigned based on the changed orientation. More specifically, assignments of the vibration motors can be made based on FIG. 1B, wherein 0° can be lined up with the present top side of the wearable device 100, 400, and −180°/180° can be lined up with the present bottom side of the wearable device 100, 400.

At operation 924, a determination is made as to whether changed orientation is within a tolerance range of the trajectory path for the selected movement or exercise. If it is determined that the changed orientation is not within a tolerance range at operation 924, then the method 900 continues at operation 926, where vibration motors are activated in a sequence to correct the changed orientation into tolerance range of the trajectory path associated with the movement or exercise. For example, the tolerance range can be when a current front direction is less than 10° deviation from the initial calibrated front direction, and a top side that is less than 15° deviation from an intended top side. One or more deviation ranges can be defined for activation of vibration motors to correct changed orientation. If it is determined that the changed orientation is within a tolerance range at operation 924, then the method 900 continues at operation 928.

At operation 928, a determination is made as to whether changed orientation has reached within end of the associated trajectory path. If it is determined that changed orientation is not within end of the associated trajectory path at operation 928, then the method 900 continues by iterating operations 918-928 until the orientation has reached within end of the associated trajectory path at operation 928. If it is determined that changed orientation is within end of the associated trajectory path at operation 928, then the method continues at operation 930, where the vibration motors are activated in a sequence that indicates a top of the repetition.

At operation 932, a determination is made as to whether a time period has elapsed (from start of the movement or completion of last time period of the movement) to periodically vibrate vibration motors in a sequence during a repetition. If it is determined that time period has elapsed at operation 932, then at operation 934 vibration motors are activated in a sequence to indicate periodic motion associated with the movement or exercise. If it is determined that time period has not elapsed at operation 932, the method 900 continues at operation 936.

At operation 936, a determination is made based on data from MPU 106 regarding an orientation change (e.g., front, top side, angle of elevation) of the wearable device 100, 400, such as when a user extends the arm to perform arm extension (e.g., bicep curl). At operation 938, bottom side vibration motors of the wearable devices 100, 400 are assigned based on the changed orientation. More specifically, assignments of the vibration motors can be made based on FIG. 1B, wherein 0° can be lined up with the present bottom side of the wearable device 100, 400, and −180°/180° can be lined up with the present top side of the wearable device 100, 400.

At operation 940, a determination is made as to whether changed orientation is within a tolerance range of the reverse trajectory path for the selected movement or exercise. If it is determined that the changed orientation is not within a tolerance range at operation 940, then the method 900 continues at operation 942, where vibration motors are activated in a sequence to correct the changed orientation into tolerance range of the reverse trajectory path associated with the movement or exercise. If it is determined that the changed orientation is within a tolerance range at operation 940, then the method 900 continues at operation 944.

At operation 944, a determination is made as to whether changed orientation has reached within end of the associated reverse trajectory path. If it is determined that changed orientation is not within end of the associated reverse trajectory path at operation 944, then the method 900 continues by iterating operations 932-944 until the orientation has reached within end of the associated reverse trajectory path at operation 944. If it is determined that changed orientation is within end of the associated reverse trajectory path at operation 944, then the method 900 continues at operation 946, where the vibration motors are activated in a sequence that indicates a bottom of the repetition (end of current repetition and start of next repetition).

At operation 948, the repetition counter is incremented (Rctr+1) and displayed to the user in order to indicate a number of completed repetitions. At operation 950, a determination is made as to whether the repetition time counter (Tctr) is less than a repetition time threshold for a repetition associated with the movement or exercise. If it is determined that Tctr is less than the threshold at operation 950, then at operation 952 vibration motors are activated in a sequence that indicates excessive quickness of the repetition, prompting the user to slow down further repetition(s). While not illustrated herein, a similar check can be provided to determine excessive slowness of the repetition, prompting the user to speed up further repetition(s). If it is determined that Tctr is not less than the threshold at operation 950, then the method 900 continues at operation 954.

At operation 954, a determination is made as to whether the training (e.g., passive correction or guidance) is complete. This could be achieved by reaching a present number of repetitions for the movement or be a selection entered by the user, such as via the multi-function button 610 or touch input device 612.

If it is determined at operation 954 that the training is complete at operation 954, then at operation 958 the vibration motors are activated in a sequence that indicates to the user whether there were errors during the movement or exercise, and at operation 960 the errors are displayed on the wearable device 100, 400, and/or connected computer 702 or mobile device 704. Thereafter, the method 900 ends at operation 962.

However, if it is determined at operation 954 that training is not complete, the method 900 continues at operation 956 that reset the time counter Tctr=0.0, and iterates operations 914-954 until training completion of the training.

In view of the foregoing, the example method 900 provides passive correction for a selected movement or exercise. More specifically, the user could use the wearable device 100, 400 in a passive correction mode when the user has learned the movement pattern for a movement or exercise, and the user thus requires occasional correction upon deviation from optimal movement. In this regard, passive correction can be provided with occasional vibration with a goal of passively correcting the user with vibration along the correct trajectory path associated with the movement or exercise.

The example method 900 thus provides three-dimensional passive correction as the user moves their body during movement or exercise. By activating appropriate vibration motors in relation to the trajectory path in different sequences, the wearable device 100, 400 can inform the user to undergo various translational and/or rotational movements along the trajectory path, to passively correct user's movement pattern for the movement or exercise.

Figure 10:
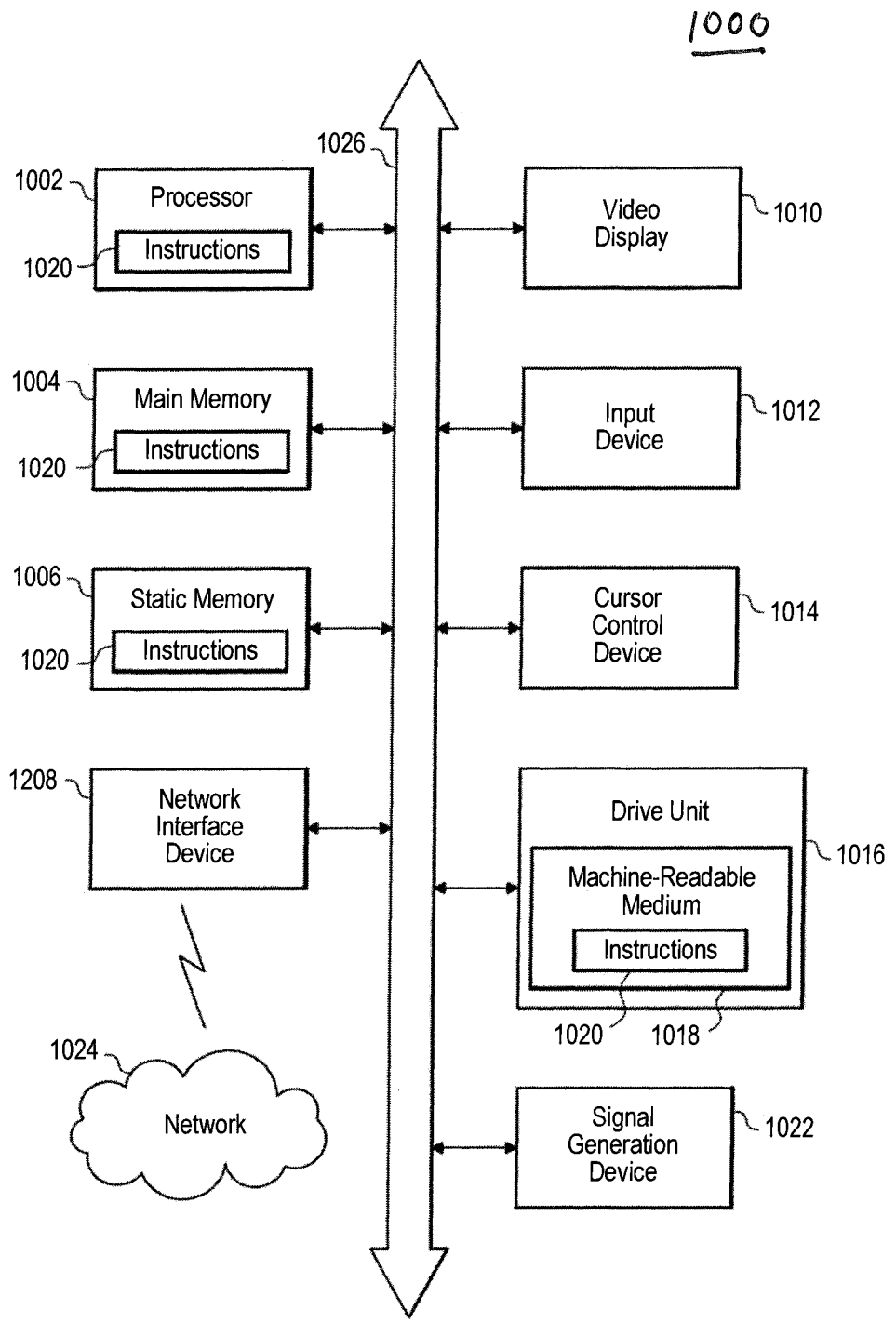
FIG. 10 is a block diagram of an illustrative embodiment of a general computer system.

FIG. 10 is a block diagram of an illustrative embodiment of a general computer system 1000. The computer system 1000 can be implemented as or integrated into the wearable device 100, 400, electronics system 104, computer 704, mobile device 704, or service provider 708, as illustrated in and described with reference to FIGS. 1-9B.

The computer system 1000 can include a set of instructions that can be executed to cause the computer system 1000 to perform any one or more of the methods or computer based functions disclosed herein. The computer system 1000, or any portion thereof, may operate as a standalone device or may be connected, e.g., using a network or other connection, to other computer systems or peripheral devices. For example, the computer system 1000 may be connected to other systems and devices via network 1024.

The computer system 1000 may also be implemented as or incorporated into various devices, such as a personal computer (PC), a tablet PC, a personal digital assistant (PDA), a mobile device (e.g., smartphone), a palmtop computer, a laptop computer, a desktop computer, a communications device, a control system, a web appliance, wearable computing device (e.g., bracelet, glasses, broach, etc.) or any other machine capable of executing a set of instructions (sequentially or otherwise) that specify actions to be taken by that machine. Further, while a single computer system 1000 is illustrated, the term "system" shall also be taken to include any collection of systems or sub-systems that individually or jointly execute a set, or multiple sets, of instructions to perform one or more computer functions.

As illustrated in FIG. 10, the computer system 1000 may include a processor 1002, e.g., a central processing unit (CPU), a graphics-processing unit (GPU), or both. Moreover, the computer system 1000 may include a main memory 1004 and a secure memory 1006 that can communicate with each other via a bus 1026. As shown, the computer system 1000 may further include a video display unit 1010, such as a liquid crystal display (LCD), an organic light emitting diode (OLED), a flat panel display, a solid state display, or a cathode ray tube (CRT). Additionally, the computer system 1000 may include an input device 1012, such as a keyboard, and a cursor control device 1014, such as a mouse. The computer system 1000 can also include a disk drive (or solid state) unit 1016, a signal generation device 1022, such as a speaker or remote control, and a network interface device 1008.

In a particular embodiment or aspect, as depicted in FIG. 10, the disk drive (or solid state) unit 1016 may include a computer-readable medium 1018 in which one or more sets of instructions 1020, e.g., software, can be embedded. Further, the instructions 1020 may embody one or more of the methods or logic as described herein. In a particular embodiment or aspect, the instructions 1020 may reside completely, or at least partially, within the main memory 1004, the static memory 1006, and/or within the processor 1002 during execution by the computer system 1000. The main memory 1004 and the processor 1002 also may include computer-readable media.

In an alternative embodiment or aspect, dedicated hardware implementations, such as application specific integrated circuits, programmable logic arrays and other hardware devices, can be constructed to implement one or more of the methods described herein. Applications that may include the apparatus and systems of various embodiments or aspects can broadly include a variety of electronic and computer systems. One or more embodiments or aspects described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments or aspects, the methods described herein may be implemented by software programs tangibly embodied in a processor-readable medium and may be executed by a processor. Further, in an exemplary, non-limited embodiment or aspect, implementations can include distributed processing, component/object distributed processing, and parallel processing. Alternatively, virtual computer system processing can be constructed to implement one or more of the methods or functionality as described herein.

It is also contemplated that a computer-readable medium includes instructions 1020 or receives and executes instructions 1020 responsive to a propagated signal, so that a device connected to a network 1024 can communicate voice, video or data over the network 1024. Further, the instructions 1020 may be transmitted or received over the network 1024 via the network interface device 1008.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, example embodiment or aspect, the computer-readable medium can include a solid-state memory, such as a memory card or other package, which houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals, such as a signal communicated over a transmission medium. A digital file attachment to an e-mail or other self-contained information archive or set of archives may be considered a distribution medium that is equivalent to a tangible storage medium. Accordingly, any one or more of a computer-readable medium or a distribution medium and other equivalents and successor media, in which data or instructions may be stored, are included herein.

In accordance with various embodiments or aspects, the methods described herein may be implemented as one or more software programs running on a computer processor. Dedicated hardware implementations including, but not limited to, application specific integrated circuits, programmable logic arrays, and other hardware devices can likewise be constructed to implement the methods described herein. Furthermore, alternative software implementations including, but not limited to, distributed processing or component/object distributed processing, parallel processing, or virtual machine processing can also be constructed to implement the methods described herein.

It should also be noted that software that implements the disclosed methods may optionally be stored on a tangible storage medium, such as: a magnetic medium, such as a disk or tape; a magneto-optical or optical medium, such as a disk; or a solid state medium, such as a memory card or other package that houses one or more read-only (non-volatile) memories, random access memories, or other re-writable (volatile) memories. The software may also utilize a signal containing computer instructions. A digital file attachment to e-mail or other self-contained information archive or set of archives is considered a distribution medium equivalent to a tangible storage medium. Accordingly, a tangible storage medium or distribution medium as listed herein, and other equivalents and successor media, in which the software implementations herein may be stored, are included herein.

Thus, a wearable device and methods to teach, correct, and monitor movement pattern of an exercise in three dimensions have been described. Although specific example embodiments or aspects have been described, it will be evident that various modifications and changes may be made to these embodiments or aspects without departing from the broader scope of the invention. Accordingly, the specification and drawings are to be regarded in an illustrative rather than a restrictive sense. The accompanying drawings that form a part hereof, show by way of illustration, and not of limitation, specific embodiments or aspects in which the subject matter may be practiced. The embodiments or aspects illustrated are described in sufficient detail to enable those skilled in the art to practice the teachings disclosed herein. Other embodiments or aspects may be utilized and derived therefrom, such that structural and logical substitutions and changes may be made without departing from the scope of this disclosure. This Detailed Description, therefore, is not to be taken in a limiting sense, and the scope of various embodiments or aspects is defined only by the appended claims, along with the full range of equivalents to which such claims are entitled.

Such embodiments or aspects of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments or aspects have been illustrated and described herein, it should be appreciated that any arrangement calculated to achieve the same purpose may be substituted for the specific embodiments or aspects shown. This disclosure is intended to cover any and all adaptations or variations of various embodiments or aspects. Combinations of the above embodiments or aspects, and other embodiments or aspects not specifically described herein, will be apparent to those of skill in the art upon reviewing the above description.

The Abstract is provided to comply with 37 C.F.R. § 1.72(b) and will allow the reader to quickly ascertain the nature and gist of the technical disclosure. It is submitted with the understanding that it will not be used to interpret or limit the scope or meaning of the claims.

In the foregoing description of the embodiments or aspects, various features are grouped together in a single embodiment for the purpose of streamlining the disclosure. This method of disclosure is not to be interpreted as reflecting that the claimed embodiments or aspects have more features than are expressly recited in each claim. Rather, as the following claims reflect, inventive subject matter lies in less than all features of a single disclosed embodiment or aspect. Thus the following claims are hereby incorporated into the Detailed Description, with each claim standing on its own as a separate example embodiment or aspect. It is contemplated that various embodiments or aspects described herein can be combined or grouped in different combinations that are not expressly noted in the Detailed Description. Moreover, it is further contemplated that claims covering such different combinations can similarly stand on their own as separate example embodiments or aspects, which can be incorporated into the Detailed Description.

The invention claimed is:

1. A wearable device to provide guidance to a user related to a movement trajectory path of an exercise, the wearable device comprising:
    a band configured to be disposed on a body part to be moved in the exercise;
    a plurality of vibration motors connected about the band, the vibration motors configured to vibrate when activated, wherein the plurality of vibration motors is connected to the band as follows:
        a first subset of the vibration motors distributed in increments in a first row disposed circumferentially about the band; and
        a second subset of the vibration motors distributed in the increments in a second row disposed circumferentially about the band, wherein the second subset is offset from the first subset along a length of the band, and vibration motors of the first subset are offset or staggered by half an increment in relation to vibration motors of the second subset;
    at least one motion processing unit connected to the band, the motion processing unit configured to determine motion data of the motion processing unit as the body part is moved in the exercise; and
    a processor configured to determine three-dimensional orientation of the band in relation to the trajectory path based on the motion data of the at least one motion processing unit, and activate one or more of the vibration motors to provide guidance to the user based on the trajectory path.

2. The wearable device of claim 1, wherein the band is an elastic band configured to be disposed on a wrist or a forearm of the user.

3. The wearable device of claim 1, wherein the band is an elastic band configured to be disposed on a combination of a forearm and an upper arm of the user.

4. The wearable device of claim 1, wherein the band comprises:
    a forearm section that comprises first motion processing units at extents of the forearm section and at least one first set of vibration motors; and
    an upper arm section that comprises a second motion processing unit and a second set of vibration motors.

5. The wearable device of claim 4, wherein the at least one first set of vibration motors comprises:
    the first subset of vibration motors distributed in increments in the first row disposed circumferentially about the forearm section of the band; and
    the second subset of the vibration motors distributed in the increments in the second row disposed circumferentially about the forearm section of the band, wherein the second subset is offset from the first subset along a length of the forearm section of the band.

6. The wearable device of claim 4, wherein the second set of vibration motors comprises:
    the first subset of vibration motors distributed in increments in the first row disposed circumferentially about the upper arm section of the band; and
    the second subset of the vibration motors distributed in the increments in the second row disposed circumferentially about the upper section of the band, wherein the second subset is offset from the first subset along a length of the upper arm section of the band.

7. The wearable device of claim 1, further comprising a plurality of light emitting diodes connected to the band, wherein the processor activates the light emitting diodes that illuminate to guide the user along the trajectory path.

8. The wearable device of claim 1, further comprising a plurality of light emitting diodes connected to the band, wherein the processor activates the light emitting diodes that illuminate to guide the user when the user deviates from the trajectory path.

9. The wearable device of claim 1, wherein guidance is active instruction in which the processor activates the one or more of the vibration motors to guide the user along the trajectory path.

10. The wearable device of claim 1, wherein guidance is passive correction in which the processor activates the one or more of the vibration motors to guide the user when the user deviates from the trajectory path.

11. A method of providing guidance to a user related to a movement trajectory path of an exercise, the method comprising:
    disposing a wearable device on a body part of the user to be moved in the exercise, the wearable device comprising a band configured to be disposed on the body part, a plurality of vibration motors connected about the band, at least one motion processing unit, and a processor connected to the band, wherein the plurality of vibration motors is connected to the band as follows:
        a first subset of the vibration motors distributed in increments in a first row disposed circumferentially about the band; and
        a second subset of the vibration motors distributed in the increments in a second row disposed circumferentially about the band, wherein the second subset is offset from the first subset along a length of the band, and vibration motors of the first subset are offset or staggered by half an increment in relation to vibration motors of the second subset;
    determining via the motion processing unit motion data as the body part is moved in the exercise;
    determining via the processor three-dimensional orientation of the band in relation to the trajectory path based on the motion data of the at least one motion processing unit; and
    activating via the processor one or more of the vibration motors to provide guidance to the user based on the trajectory path.

12. The method of claim 11, wherein the method comprises disposing the band on a wrist or a forearm of the user.

13. The method of claim 11, wherein the method comprises disposing the band on a combination of a forearm and an upper arm of the user.

14. The method of claim 11, wherein the band comprises a forearm arm section and an upper arm section, the method comprising:
    disposing first motion processing units at extents of the forearm section, and at least one first set of vibration motors; and
    disposing a second motion processing unit and a second set of vibration motors at the upper arm section.

15. The method of claim 14, wherein the at least one first set of vibration motors comprises the first subset of vibration motors and the second subset of vibration motors, the method further comprises:
    distributing the first subset of vibration motors in increments in the first row disposed circumferentially about the forearm section of the band; and
    distributing the second subset of the vibration motors in the increments in the second row disposed circumferentially about the forearm section of the band, wherein the second subset is offset from the first subset along a length of the forearm section of the band.

16. The method of claim 14, wherein the second set of vibration motors comprises the first subset of vibration motors and the second subset of vibration motors, the method comprising:
   distributing the first subset of vibration motors in increments in the first row disposed circumferentially about the upper arm section of the band; and
   distributing the second subset of the vibration motors in the increments in the second row disposed circumferentially about the upper section of the band, wherein the second subset is offset from the first subset along a length of the upper arm section of the band.

17. The method of claim 11, further comprising:
   connecting a plurality of light emitting diodes to the band; and
   activating via the processor the light emitting diodes that illuminate to guide the user along the trajectory path.

18. The method of claim 11, further comprising:
   connecting a plurality of light emitting diodes connected to the band; and
   activating via the processor the light emitting diodes that illuminate to guide the user when the user deviates from the trajectory path.

19. The method of claim 11, wherein guidance is active instruction, further comprising activating via the processor the one or more of the vibration motors to guide the user along the trajectory path.

20. The method of claim 11, wherein guidance is passive correction, further comprising activating via the processor the one or more of the vibration motors to guide the user when the user deviates from the trajectory path.

21. A wearable device to provide guidance to a user related to a movement trajectory path of an exercise, the wearable device comprising:
   a band configured to be disposed on a body part to be moved in the exercise, wherein the band comprises a forearm section and an upper arm section;
   a plurality of vibration motors connected about the band, the vibration motors configured to vibrate when activated;
   a plurality of motion processing units connected to the band, the motion processing units configured to determine motion data of the motion processing units as the body part is moved in the exercise, wherein the forearm section comprises first motion processing units at extents of the forearm section and at least one first set of vibration motors, and the upper arm section comprises a second motion processing unit and a second set of vibration motors; and
   a processor configured to determine three-dimensional orientation of the band in relation to the trajectory path based on the motion data of the motion processing units, and activate one or more of the vibration motors to provide guidance to the user based on the trajectory path.

22. The wearable device of claim 21, wherein the at least one first set of vibration motors comprises:
   a first subset of vibration motors distributed in increments in a first row disposed circumferentially about the forearm section of the band; and
   a second subset of the vibration motors distributed in the increments in a second row disposed circumferentially about the forearm section of the band, wherein the second subset is offset from the first subset along a length of the forearm section of the band, and vibration motors of the first subset are offset or staggered by half an increment in relation to the vibration motors of the second subset.

23. The wearable device of claim 21, wherein the second set of vibration motors comprises:
   a first subset of vibration motors distributed in increments in a first row disposed circumferentially about the upper arm section of the band; and
   a second subset of the vibration motors distributed in the increments in a second row disposed circumferentially about the upper section of the band, wherein the second subset is offset from the first subset along a length of the upper arm section of the band, and vibration motors of the first subset are offset or staggered by half an increment in relation to the vibration motors of the second subset.

24. The wearable device of claim 21, further comprising a plurality of light emitting diodes connected to the band, wherein the processor activates the light emitting diodes that illuminate to guide the user along the trajectory path.

25. The wearable device of claim 21, further comprising a plurality of light emitting diodes connected to the band, wherein the processor activates the light emitting diodes that illuminate to guide the user when the user deviates from the trajectory path.

26. The wearable device of claim 21, wherein guidance is active instruction in which the processor activates the one or more of the vibration motors to guide the user along the trajectory path.

27. The wearable device of claim 21, wherein guidance is passive correction in which the processor activates the one or more of the vibration motors to guide the user when the user deviates from the trajectory path.

28. A method of providing guidance to a user related to a movement trajectory path of an exercise, the method comprising:
   disposing a wearable device on a body part of the user to be moved in the exercise, the wearable device comprising a band configured to be disposed on the body part, connected to the band a plurality of vibration motors, a plurality of motion processing units, and a processor, wherein the band comprises a forearm section and an upper arm section;
   determining via the motion processing units motion data as the body part is moved in the exercise, wherein the forearm section comprises first motion processing units at extents of the forearm section and at least one first set of vibration motors, and the upper arm section comprises a second motion processing unit and a second set of vibration motors;
   determining via the processor three-dimensional orientation of the band in relation to the trajectory path based on the motion data of the motion processing units; and
   activating via the processor one or more of the vibration motors to provide guidance to the user based on the trajectory path.

29. The method of claim 28, wherein the at least one first set of vibration motors comprises the first subset of vibration motors and the second subset of vibration motors, the method further comprises:
   distributing the first subset of vibration motors in increments in the first row disposed circumferentially about the forearm section of the band; and
   distributing the second subset of the vibration motors in the increments in the second row disposed circumferentially about the forearm section of the band, wherein the second subset is offset from the first subset along a length of the forearm section of the band.

30. The method of claim 28, wherein the second set of vibration motors comprises the first subset of vibration motors and the second subset of vibration motors, the method comprising:
  distributing the first subset of vibration motors in increments in the first row disposed circumferentially about the upper arm section of the band; and
  distributing the second subset of the vibration motors in the increments in the second row disposed circumferentially about the upper section of the band, wherein the second subset is offset from the first subset along a length of the upper arm section of the band.

31. The method of claim 28, further comprising:
  connecting a plurality of light emitting diodes to the band; and
  activating via the processor the light emitting diodes that illuminate to guide the user along the trajectory path.

32. The method of claim 28, further comprising:
  connecting a plurality of light emitting diodes connected to the band; and
  activating via the processor the light emitting diodes that illuminate to guide the user when the user deviates from the trajectory path.

33. The method of claim 28, wherein guidance is active instruction, further comprising activating via the processor the one or more of the vibration motors to guide the user along the trajectory path.

34. The method of claim 28, wherein guidance is passive correction, further comprising activating via the processor the one or more of the vibration motors to guide the user when the user deviates from the trajectory path.

* * * * *